US012551879B2

(12) United States Patent
Liu et al.

(10) Patent No.: US 12,551,879 B2
(45) Date of Patent: Feb. 17, 2026

(54) SANDWICH-STRUCTURED THIN FILM COMPOSITE ANION EXCHANGE MEMBRANE FOR REDOX FLOW BATTERY APPLICATIONS

(71) Applicant: UOP LLC, Des Plaines, IL (US)

(72) Inventors: Chunqing Liu, Arlington Heights, IL (US); Chaoyi Ba, Schaumburg, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/388,956

(22) Filed: Jul. 29, 2021

(65) Prior Publication Data

US 2022/0370999 A1 Nov. 24, 2022

Related U.S. Application Data

(60) Provisional application No. 63/190,383, filed on May 19, 2021.

(51) Int. Cl.
| | | |
|---|---|---|
| *B01J 41/16* | (2006.01) | |
| *B01J 41/13* | (2017.01) | |
| *H01M 8/08* | (2016.01) | |
| *H01M 8/18* | (2006.01) | |
| *H01M 50/414* | (2021.01) | |
| *H01M 50/429* | (2021.01) | |
| *H01M 50/449* | (2021.01) | |
| *H01M 50/491* | (2021.01) | |
| *H01M 50/497* | (2021.01) | |

(52) U.S. Cl.
CPC ............ *B01J 41/16* (2013.01); *B01J 41/13* (2017.01); *H01M 8/08* (2013.01); *H01M 8/18* (2013.01); *H01M 50/414* (2021.01); *H01M 50/4295* (2021.01); *H01M 50/449* (2021.01); *H01M 50/491* (2021.01); *H01M 50/497* (2021.01)

(58) Field of Classification Search
CPC .. B01D 2325/42; H01M 50/491; H01M 8/18; H01M 50/449
See application file for complete search history.

(56) References Cited

U.S. PATENT DOCUMENTS

| | | | |
|---|---|---|---|
| 3,790,610 A | 2/1974 | Lum et al. | |
| 4,167,214 A | 9/1979 | Street, Jr. | |
| 5,147,553 A * | 9/1992 | Waite | B01D 69/125 |
| | | | 427/245 |
| 6,468,688 B2 | 10/2002 | Kazacos et al. | |
| 9,865,895 B2 | 1/2018 | Evans et al. | |
| 10,586,996 B2 | 3/2020 | Evans et al. | |
| 2008/0149561 A1* | 6/2008 | Chu | B01D 69/1251 |
| | | | 210/500.21 |
| 2014/0057154 A1 | 2/2014 | Timmons | |
| 2014/0227574 A1* | 8/2014 | Savinell | H01M 8/04186 |
| | | | 429/105 |
| 2018/0241065 A1 | 8/2018 | Schubert et al. | |
| 2019/0060844 A1 | 2/2019 | Liu et al. | |
| 2019/0067725 A1 | 2/2019 | Wainright et al. | |
| 2019/0326578 A1 | 10/2019 | Frischmann et al. | |
| 2020/0052317 A1 | 2/2020 | Song | |
| 2020/0078736 A1 | 3/2020 | Small et al. | |

FOREIGN PATENT DOCUMENTS

| | | |
|---|---|---|
| CN | 112334365 A | 2/2021 |
| CN | 112619441 A | 4/2021 |
| KR | 101812739 B1 | 12/2017 |
| WO | 2019118662 A1 | 6/2019 |
| WO | 2022140714 A1 | 6/2022 |

OTHER PUBLICATIONS

Hawthorne, Krista L., Jesse S. Wainright, and Robert F. Savinell. "Studies of iron-ligand complexes for an all-iron flow battery application." Journal of The Electrochemical Society 161.10 (2014): A1662. (Year: 2014).*

Liu, Yan, et al. "Preparation of layer-by-layer nanofiltration membranes by dynamic deposition and crosslinking." Membranes 9.2 (2019): 20. (Year: 2019).*

Li, Wei, et al. "A positively charged composite nanofiltration membrane modified by EDTA for LiCl/MgCl2 separation." Separation and Purification Technology 186 (2017): 233-242. (Year: 2017).*

Huang, Yifeng, et al. "Layer-by-layer self-assembled chitosan/PAA nanofiltration membranes." Separation and Purification Technology 207 (2018): 142-150. (Year: 2018).*

Lin, Zhen, et al. "LBL assembled polyelectrolyte nanofiltration membranes with tunable surface charges and high permeation by employing a nanosheet sacrificial layer." Journal of Materials Chemistry A 5.28 (2017): 14819-14827. (Year: 2017).*

Merino-Garcia, Ivan, et al. "Characterization of poly (Acrylic) acid-modified heterogenous anion exchange membranes with improved monovalent permselectivity for RED." Membranes 10.6 (2020): 134. (Year: 2020).*

Bera, Anupam, and Suresh K. Jewrajka. "Tailoring polyamide thin film composite nanofiltration membranes by polyethyleneimine and its conjugates for the enhancement of selectivity and antifouling property." RSC advances 6.6 (2016): 4521-4530. (Year: 2016).*

(Continued)

*Primary Examiner* — Allison Bourke
*Assistant Examiner* — Kayla Elaine Clary

(57) ABSTRACT

A low cost, sandwich-structured thin film composite (TFC) anion exchange membrane for redox flow batteries, fuel cells, electrolysis, and other electrochemical reaction applications is described. The sandwich-structured TFC anion exchange membrane comprises a microporous substrate membrane, a first hydrophilic ionomeric polymer coating layer on the surface of the microporous substrate layer, a cross-linked protonated polyamine anion exchange polymer coating layer on top of the first hydrophilic ionomeric polymer coating layer, and a second hydrophilic ionomeric polymer protective layer on top of the cross-linked protonated polyamine anion exchange polymer coating layer. Methods of making the TFC anion exchange membrane comprises a microporous substrate membrane and redox flow battery system incorporating the TFC anion exchange membrane comprises a microporous substrate membrane are also described.

11 Claims, No Drawings

(56) References Cited

OTHER PUBLICATIONS

Yensen, Nicholas et al, Open source all-iron batter for renewable energy storage, HardwareX 6 (2019).
Tucker, Michael C. et al., All-Iron Redox Flow Battery Tailored for Off-Grid Portable Applications, ChemSusChem 8 (23) Dec. 1, 2015.
Zhang, Hongzhang et al., Nanofiltration (NF) membranes: the next generation separators for all vanadium redox flow batteries (VRBs)?, Energy Environ.Sci., 2011, 4, 1676.
Teng, Xiangguo et al., Nafion/organically modified silicate hybrids membrane for vanadium redox flow battery, Journal of Power Sources 189 (2009), 1240-1246.
Chieng, S.C. et al., Modification of Daramic, microporous separator, for redox flow battery applications, Journal of Membrane Science, 75 (1992) 81-91.
Wei, Xiaoliang et al., Micropourous separators for Fe/V redox flow batteries, Journal of Power Sources 218 (2012) 39-45.
Gubler, Lorenz, Membranes and separators for redox flow batteries, Current Opinion in Electrochemistry 2019, 18:31-36.
Mohammadi, T. et al., Use of polyelectrolyte for incorporation of ion-exchange groups in composite membranes for vanadium redox flow battery application, Journal of Power Sources 56 (1995) 91-96.
Mohammadi, T. et al., Evaluation of the chemical stability of some membranes in vanadium solution, Journal of Applied Electrochemistry 27 (1997) 153-160.
Ding, Cong et al., Vanadium Flow Battery for Energy Storage: Prospects and Challenges, The Journal of Physical Chemistry Letters, 2013, 4, 1281-1294.
Varco, John R. et al., Anion-exchange membranes in electrochemical energy systems, Energy Environ. Sci., 2014, 7, 3135-3191.
Shi, Yu et al, Recent development of membrane for vanadium redox flow battery applications: A review, Applied Energy 238 (2019) 202-224.
Zhang, Hongzhang et al., Silica modified nanofiltration membranes with improved selectivity for redox flow battery application, Energy Environ. Sci., 2012, 5, 6299.
Mohammadi, T. et al., Use of polyelectrolyte for incorporation if ion-exchange groups in composite membranes for vanadium redox flow battery applications, Journal of Power Sources 56 (1995) 91-96.
Modiba, Portia et al., Electrochemical impedance spectroscopy of Ce(IV) with aminopolycarboxylate ligands for redox flow batteries applications, Journal of Power Sources 205 (2012) 1-9.
International Preliminary Report on Patentability from corresponding PCT application No. PCT/US2021/072186, issued on Nov. 21, 2023.
Extended European Search Report from corresponding European application No. 21941016.4, dated Mar. 6, 2025.

* cited by examiner

SANDWICH-STRUCTURED THIN FILM COMPOSITE ANION EXCHANGE MEMBRANE FOR REDOX FLOW BATTERY APPLICATIONS

RELATED APPLICATIONS

This application claims the benefit of U.S. Provisional Patent Application Ser. No. 63/190,383 filed May 19, 2021, the entirety of which is incorporated herein by reference.

BACKGROUND OF THE INVENTION

Energy storage systems have played a key role in harvesting energy from various sources. These energy storage systems can be used to store energy and convert it for use in many different applications, such as building, transportation, utility, and industry. A variety of energy storage systems have been used commercially, and new systems are currently being developed. Energy storage systems can be categorized as electrochemical and battery, thermal, thermochemical, flywheel, compressed air, pumped hydropower, magnetic, biological, chemical, and hydrogen energy storage. The development of cost-effective and eco-friendly energy storage systems is needed to solve the energy crisis and to overcome the mismatch between generation and end use.

Renewable energy sources, such as wind and solar power, have transient characteristics because they depend on environmental conditions and therefore require associated energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. The conversion of electricity via water electrolysis into hydrogen as an energy carrier without generation of carbon monoxide or carbon dioxide as byproducts enables a coupling of the electricity, chemical, mobility, and heating sectors. Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Equation 1 below. The water electrolysis process is an endothermic process, and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) electrolysis, anion exchange membrane (AEM) electrolysis, and solid oxide electrolysis.

In the PEM water electrolysis system, an anode and a cathode are separated by a solid PEM electrolyte such as a sulfonated tetrafluoroethylene based fluoropolymer copolymer sold under the trademark Nafion® by Chemours Company. The anode and cathode catalysts typically comprise $IrO_2$ and Pt, respectively. At the positively charged anode, pure water is oxidized to produce oxygen gas, electrons (e), and protons; the reaction is given by Equation 2. The protons are transported from the anode to the cathode through the PEM which conducts protons. At the negatively charged cathode, a reduction reaction takes place with electrons from the cathode being given to protons to form hydrogen gas; the reaction is given by Equation 3. The PEM not only conducts protons from the anode to the cathode, but also separates the $H_2$ and $O_2$ produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (about 20 to about 90° C.) operation, and high purity oxygen byproduct. However, one of the major challenges for PEM water electrolysis is the high capital cost of the cell stack which includes acid-tolerant stack hardware, noble metal catalysts required for the electrodes, and the PEM, all of which are expensive.

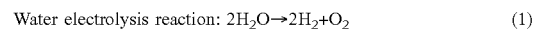

Water electrolysis reaction: $2H_2O \rightarrow 2H_2 + O_2$ (1)

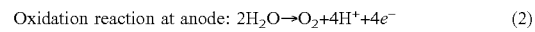

Oxidation reaction at anode: $2H_2O \rightarrow O_2 + 4H^+ + 4e^-$ (2)

Reduction reaction at cathode: $2H^+ + 2e^- \rightarrow H_2$ (3)

Fuel cells, as a next generation clean energy resource, convert the energy of chemical reactions, such as an oxidation/reduction redox reaction of hydrogen and oxygen, into electric energy. Three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells.

The anode in an electrochemical cell is the electrode at which the predominant reaction is oxidation (e.g., the water oxidation/oxygen evolution reaction electrode for a water or $CO_2$ electrolyzer, or the hydrogen oxidation electrode for a fuel cell).

RFBs are composed of two external storage tanks filled with active materials comprising metal ions that may be in different valance states, two circulation pumps, and a flow cell with a separation membrane. The separation membrane is located between the anode and the cathode and is used to separate the anolyte and the catholyte, as well as to utilize the current circuit by allowing the transfer of balancing ions. The anolyte, catholyte, anode, and cathode may also be referred to as plating electrolyte or negative electrolyte, redox electrolyte or positive electrolyte, plating electrode or negative electrode, and redox electrode or positive electrode respectively. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high-cost vanadium and an expensive membrane. All-iron redox flow batteries (IFB) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge; the reaction is given by Equation 4. The anode side half-cell reaction involves the deposition and dissolution of iron in the form of a solid plate; the reaction is given by Equation 5. The overall reaction is shown in Equation 6.

Redox electrode: $2Fe^{2+} \leftrightarrow Fe^{3+} + 2e^-$ +0.77V (4)

Plating electrode: $Fe^{3+} + 2e^- \leftrightarrow Fe^0$ −0.44V (5)

Total: $3Fe^{2+} \leftrightarrow Fe^0 + 2Fe^{3+}$ 1.21V (6)

The membrane is one of the key materials that make up a battery or electrolysis cell and is an important driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m²), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high temperature without H₂O, high proton conductivity at high temperature with maintained high relative humidity, and high mechanical strength (thickness, low swelling).

The two main types of membranes for redox flow battery, fuel cell, and electrolysis applications are polymeric ion-exchange membranes and microporous separators. The polymeric ion-exchange membranes can be cation-exchange membranes comprising $-SO_3^-$, $-COO^-$, $-PO_3^{2-}$, $-PO_3H^-$, or $-C_6H_4O^-$ cation exchange functional groups, anion-exchange membranes comprising $-NH_3^+$, $-NRH_2^+-NR_2H^+$, $-NR_3^+$, or $-SR_2^-$ anion exchange functional groups, or bipolar membranes comprising both cation-exchange and anion-exchange polymers. The polymers for the preparation of ion-exchange membranes can be perfluorinated ionomers such as Nafion®, Flemion®, and NEOSEPTA®-F, partially fluorinated polymers, non-fluorinated hydrocarbon polymers, non-fluorinated polymers with aromatic backbone, or acid-base blends. In general, perfluorosulfonic acid (PFSA)-based membranes, such as Nafion® and Flemion®, are used in vanadium redox flow battery (VRFB) systems due to their oxidation stability, good ion conductivity, unique morphology, mechanical strength, and high electrochemical performance. However, these membranes have low balancing ions/electrolyte metal ion selectivity, and high electrolyte metal ion crossover which causes capacity decay in VRFBs, and they are expensive.

The microporous and nanoporous membrane separators can be inert microporous/nanoporous polymeric membrane separators, inert non-woven porous films, or polymer/inorganic material coated/impregnated separators. The inert microporous/nanoporous polymeric membrane separators can be microporous polyethylene (PE), polypropylene (PP), PE/PP, or composite inorganic/PE/PP membrane, inert non-woven porous films, non-woven PE, PP, polyamide (PA), polytetrafluoroethylene (PTFE), polyvinyl chloride (PVC), polyvinylidene fluoride (PVDF), polyethylene terephalate (PET), or polyester porous film. For example, microporous Daramic® and Celgard® membrane separators made from PE, PP, or blends of PE and PP polymers are commercially available. They normally have high ionic conductivity, but also high electrolyte cross-over for RFB applications.

Therefore, there is a need for a stable, high performance (e.g., low gas crossover and excellent conductivity), low-cost membrane for redox flow battery applications to improve one or more of voltage efficiency (VE), coulombic efficiency (CE), and energy efficiency (EE) of the redox flow batteries, for fuel cells, and for electrolysis applications.

DESCRIPTION OF THE INVENTION

US Provisional Patent Application No. 63/109,683 disclosed a new type of low cost, high performance, ionically conductive thin film composite (TFC) membrane comprising a hydrophilic ionomeric polymer coated TFC membrane for energy storage applications such as redox flow battery, fuel cell, and electrolysis applications. The hydrophilic ionomeric polymer coating layer is a dense nonporous layer.

The present invention discloses a new type of low cost, sandwich-structured thin film composite (TFC) anion exchange membrane for redox flow batteries, fuel cells, electrolysis, and other electrochemical reaction applications. The sandwich-structured TFC anion exchange membrane comprises a microporous substrate membrane, a first hydrophilic ionomeric polymer coating layer on the surface of the microporous substrate layer, a cross-linked protonated polyamine anion exchange polymer coating layer on top of the first hydrophilic ionomeric polymer coating layer, and a second hydrophilic ionomeric polymer protective layer on top of the cross-linked protonated polyamine anion exchange polymer coating layer to form the sandwich-structured TFC anion exchange membrane. The cross-linked protonated polyamine anion exchange polymer coating layer is formed from a cross-linking reaction between a cross-linking agent, such as trimesoyl chloride (TMC) or ethylene glycol diglycidyl ether (EDGE), and a polyamine, such as polyethylene imine (PEI) polymer, or a mixture of a polyamine and a diamine molecule. The microporous substrate membrane may be made from a different polymer from the hydrophilic ionomeric polymer. The sandwich-structured coating layers will conduct protons, supporting electrolyte anions such as Cl⁻, but rejecting electrolyte cations, such as $Fe^{2+}$ or $Fe^{3+}$, and it is selective for H⁺ and Cl⁻/$Fe^{2+}$ or $Fe^{3+}$.

The sandwich-structured TFC anion exchange membrane is proton and anionic conductive. The ionic conductivity means that the sandwich-structured TFC anion exchange membrane can transport the charge-carrying ions, such as protons or chloride ion (Cl⁻), from one side of the membrane to the other side of the membrane to maintain the electric circuit. The electrical balance is achieved by the transport of charge-carrying ions (such as protons and chloride ions in all iron redox flow battery system) in the electrolytes across the membrane during the operation of the battery cell. The ionic conductivity (σ) of the sandwich-structured TFC anion exchange membrane is a measure of its ability to conduct charge-carrying ions, and the measurement unit for conductivity is Siemens per meter (S/m). The ionic conductivity (σ) of the ionically conductive sandwich-structured TFC anion exchange membrane is measured by determining the resistance (R) of the membrane between two electrodes separated by a fixed distance. The resistance is determined by electrochemical impedance spectroscopy (EIS), and the measurement unit for the resistance is Ohm (Ω). The membrane area specific resistance (RA) is the product of the resistance of the membrane (R) and the membrane active area (A), and the measurement unit for the membrane area specific resistance is (Ω·cm²). The membrane ionic conductivity (σ, S/cm) is proportional to the membrane thickness (L, cm) and inversely proportional to the membrane area specific resistance (RA, Ω·cm²).

The performance of the ionically conductive sandwich-structured TFC anion exchange membrane for RFB applications may be evaluated by several parameters including one or more of membrane solubility and stability in the electrolytes, area specific resistance, numbers of battery charge/discharge cycling, electrolyte crossover through the membrane, voltage efficiency (VE), coulombic efficiency (CE), and energy efficiency (EE) of the RFB cell. CE is the ratio of a cell's discharge capacity divided by its charge capacity. A higher CE, indicating a lower capacity loss, is mainly due to the lower rate of crossover of electrolyte ions, such as ferric and ferrous ions, in the iron redox flow battery system. VE is defined as the ratio of a cell's mean discharge voltage divided by its mean charge voltage (See M. Skyllas-Kazacos, C. Menictas, and T. Lim, Chapter 12 on Redox Flow Batteries for Medium- to Large-Scale Energy Storage in *Electricity Transmission, Distribution and Storage Systems*, A volume in Woodhead Publishing Series in Energy, 2013). A higher VE, indicating a higher ionic conductivity, is mainly due to the low area specific resistance of the membrane. EE is the product of VE and CE and is an indicator of energy loss in charge-discharge processes. EE is a key parameter to evaluate an energy storage system.

The sandwich-structured TFC anion exchange membrane combines the size-exclusion ion-conducting separation mechanism of a hydrogel type of ionomeric polymer with anion-exchange ion-conducting separation mechanism of the cross-linked anion exchange polymer to achieve high anionic conductivity and permeability and high anionic/electrolyte selectivity (low permeability/crossover to electrolytes), and therefore high voltage efficiency (VE), coulombic efficiency (CE), energy efficiency (EE), and increased energy density for redox flow battery applications.

The sandwich-structured TFC anion exchange membrane comprises a microporous substrate membrane, a first hydrophilic ionomeric polymer coating layer on the surface of the microporous substrate layer, a cross-linked protonated polyamine anion exchange polymer coating layer on top of the hydrophilic ionomeric polymer coating layer, and a second hydrophilic ionomeric polymer protective layer on top of the cross-linked protonated polyamine anion exchange polymer coating layer.

The thickness of the microporous substrate membrane can be in a range of about 10 to about 1000 micrometers, or about 10 to about 900 micrometers, or about 10 to about 800 micrometers, or about 10 to about 700 micrometers, or about 10 to about 600 micrometers, or about 10 to about 500 micrometers, or about 20 to about 500 micrometers. The average pore size of the microporous substrate membrane can be in a range of about 10 nanometers to about 50 micrometers, or about 50 nanometers to about 10 micrometers, or about 0.2 micrometers to about 1 micrometer.

The thickness of the first hydrophilic ionomeric polymer coating layer on the surface of the microporous substrate layer is in the range of about 1 micrometer to about 100 micrometers, or about 5 micrometers to about 50 micrometers.

The thickness of the cross-linked protonated polyamine anion exchange polymer coating layer is in the range of about 10 nanometers to about 10 micrometers, or about 30 nanometers to about 2 micrometers, or about 30 nanometers to about 1 micrometer.

The thickness of the second hydrophilic ionomeric polymer protective layer on top of the cross-linked protonated polyamine anion exchange polymer coating layer is in the range of about 100 nanometers to about 20 micrometers, or about 100 nanometers to about 10 micrometers, or about 1 micrometer to about 5 micrometers.

The cross-linked protonated polyamine anion exchange polymer coating layer on top of the hydrophilic ionomeric polymer coating layer is formed from a cross-linking reaction between a cross-linking agent and a polyamine polymer. The cross-linked protonated polyamine anion exchange polymer coating layer is insoluble in water and contains anionic conductive, protonated primary amino, secondary amino, and/or tertiary amino functional groups. The cross-linked protonated polyamine anion exchange polymer coating layer not only has high stability in an aqueous solution due to its insolubility in water, but also has high affinity to water and charge-carrying ions such as $H_3O^+$ and $Cl^-$ due to the hydrophilicity and anionic conductivity of the cross-linked protonated polyamine polymer and therefore high ionic conductivity and low membrane specific area resistance. The primary amino ($-RNH_2$, R is alkyl or aromatic group), secondary amino ($-R_2NH$, R is alkyl or aromatic group), or tertiary amino ($-R_3N$, R is alkyl or aromatic group) functional groups on the polyamine are protonated before, during, or after the cross-linking reaction to form protonated primary amino, secondary amino, or tertiary amino functional groups with anion exchange properties.

The polyamine polymer (with more than two amine groups) suitable for the preparation of the cross-linked protonated polyamine anion exchange polymer coating layer can be selected from, but is not limited to, polyethylenimine (PEI), spermine, polyvinylamine (PVAm), poly(allylamine) (PAA), poly(amidoamine) (PAMAM), poly-N-isopropylallylamine, poly-N-tert-butylallylamine, poly-N-1,2-poly-N-methylallylamine, poly-N,N-dimethylallylamine, poly-2-vinylpiperidine, poly-4-vinylpiperidine, polyaminostyrene, or combinations thereof. The polyamine polymer can be a linear polyamine, a hyperbranched polyamine, or a dendritic polyamine. The PEI polymer can be a linear PEI polymer, a hyperbranched PEI polymer, or a dendritic PEI polymer.

In some embodiments, a diamine molecule may be included with the polyamine during the cross-linking reaction. The diamine molecule is an amine with exactly two amino group. Some examples of the diamine molecules include, but are not limited to, piperazine, 1,4-diazacycloheptane, ethylenediamine, 1,2-dimethylethyenediamine, 1,3-diaminopropane, putrescine, cadaverine, hexamethylenediamine, diphenylethylenediamine, 1,4-diazacyclopheptane, p-phenylenediamine, m-phenylenediamine, o-phenylenediamine, p-xylylenediamine, m-xylylenediamine, o-xylylenediamine, and combinations thereof.

The cross-linking agent suitable for the preparation of the cross-linked protonated polyamine anion exchange polymer coating layer can be selected from, but is not limited to, trimesoyl chloride (TMC), ethylene glycol diglycidyl ether (EDGE), epichlorohydrin, a dibromoalkane, a dianhydride, a diisocyanate, a polyimide, a polysaccharide, or combinations thereof. Suitable polysaccharide cross-linking agents include, but are not limited to, dextran, pullulan, carboxymethyl cellulose, sodium alginate, chitosan, hyaluronate, carboxymethyl curdlan, pectic acid, chitin, chondroitin, xanthan gum, or combinations thereof.

The cross-linking reaction between the polyamine and the cross-linking agent can be selected from interfacial polymerization or bulk polymerization. The interfacial polymerization occurs at the interface of two immiscible phases comprising a polyamine aqueous phase and an organic solvent phase having the cross-linking agent. The bulk polymerization occurs in one miscible phase comprising the polyamine and the cross-linking agent. The cross-linking reaction occurs at a temperature in a range of room temperature to about 100° C., or room temperature to about 80° C., or room temperature to about 60° C.

The first hydrophilic ionomeric polymer coating layer on the surface of the microporous substrate layer and the second hydrophilic ionomeric polymer protective layer on top of the cross-linked protonated polyamine anion exchange polymer coating layer may be made of the same or different hydrophilic ionomeric polymers. The coating layers and the microporous substrate membrane are formed from different polymers. The hydrophilic ionomeric polymer may be present in the micropores of the microporous substrate membrane.

The hydrophilic ionomeric polymer may comprise a polysaccharide polymer, a poly(acrylic acid) polymer, a poly (methacrylic acid) polymer, a polyethylacrylic acid polymer, a polyethylene-co-acrylic acid polymer, a polybutadiene-co-acrylic acid polymer, a polypropylene-co-acrylic acid polymer, or combinations thereof. The polysaccharide polymer used in the current invention can be selected from, but is not limited to, alginic acid, hyaluronic acid, carrageenic acid, chitosan, pectinic acid, pectic acid, carboxymethyl curdlan, carboxymethyl cellulose acid, or combinations thereof. The hydrophilic polymer contains high water affinity polar functional groups such as —OH, —NH$_2$, —O—, —COOH, —SO$_3$H or charged functional groups such as —SO$_3^-$, —COO$^-$ or —NH$_3^+$ group. The hydrophilic ionomeric polymer has high stability in an aqueous electrolyte solution due to its insolubility in the aqueous electrolyte solution and therefore low membrane specific area resistance.

In some embodiments, the hydrophilic ionomeric polymer may comprise alginic acid, hyaluronic acid, carrageenic acid, or combinations thereof.

The microporous substrate membrane should have good thermal stability (e.g., be stable up to at least 100° C.), high aqueous and organic solution resistance (be insoluble in aqueous and organic solutions) under low pH condition (e.g., pH less than 6), high resistance to oxidizing and reducing conditions (e.g., be insoluble and have no performance drop under oxidizing and reducing conditions), high mechanical strength (e.g., no dimensional change under the system operation conditions), as well as other factors dictated by the operating conditions for energy storage applications. The microporous substrate membrane must be compatible with the cell chemistry and meet the mechanical demands of cell stacking or winding assembly operations. The microporous substrate membrane has high ionic conductivity, but low selectivity of charge-carrying ions such as protons, hydrated protons, chloride ions, potassium ions, hydrated potassium ions, sodium ions, and hydrated sodium ions over the electrolytes such as ferric ions, hydrated ferric ions, ferrous ions, and hydrated ferrous ions.

Suitable polymers for the microporous substrate membrane can be selected from, but are not limited to, polyolefins such as polyethylene and polypropylene, polyamide such as Nylon 6 and Nylon 6,6, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof. These polymers provide a range of desirable properties, such as low cost, high stability in water and electrolytes under a wide range of pH, good mechanical stability, and ease of processability for membrane fabrication.

The microporous substrate membrane can have either a symmetric porous structure or an asymmetric porous structure. The asymmetric microporous substrate membrane characterized by a top thin layer with relatively smaller pores and supported on an open, much thicker porous substructure bottom layer can be formed by a phase inversion membrane fabrication approach followed by direct air drying, or by phase inversion followed by solvent exchange methods. See, for example, US Provisional Application Ser. No. 63/165,777 filed Mar. 25, 2021 entitled Ionically Conductive Asymmetric Composite Membrane for Electrochemical Energy System Applications, which is incorporated herein by reference. The microporous substrate membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of thermoplastic polyolefins may be done with the aid of a hydrocarbon liquid or low molecular weight oil mixed with the polymer resin or a mixture of the polymer resin and inorganic nanoparticles in the melt phase. The melt mixture is extruded through a die similar to the dry processed separators.

Another aspect of the invention are methods of making the sandwich-structured TFC anion exchange membrane. In one embodiment, the method comprises applying a layer of a solution comprising a hydrophilic ionomeric polymer to one surface of a microporous substrate membrane; drying the coated membrane forming a first hydrophilic ionomeric polymer coating layer on the microporous substrate membrane; applying a first solution comprising a polyamine, or a mixture of a polyamine and a diamine and applying a second solution comprising the cross-linking agent to the surface of the polyamine-containing hydrophilic ionomeric polymer coating layer on top of the hydrophilic ionomeric polymer coating layer. The cross-linking reaction between the polyamine and the cross-linking agent or between the mixture of the polyamine and the diamine molecule and the cross-linking agent to form the cross-linked protonated polyamine anion exchange polymer layer takes place. The reaction can take place at a temperature in a range of room temperature to about 80° C. Optionally, the pH of the first solution of polyamine may be adjusted to about 7 to about 8 before it is applied to the surface of the hydrophilic ionomeric polymer coating layer. A second layer of the solution comprising a hydrophilic ionomeric polymer is applied to the surface of the cross-linked protonated polyamine anion exchange polymer.

In another embodiment, the method comprises applying a layer of a solution comprising a hydrophilic ionomeric polymer to one surface of a microporous substrate membrane; drying the coated membrane forming a first hydrophilic ionomeric polymer coating layer on the microporous substrate membrane; applying a first aqueous or non-aqueous solution of a mixture of a polyamine and a cross-linking agent, or a mixture of polyamine, a diamine molecule, and a cross-linking agent to the surface of the hydrophilic ionomeric polymer coating layer, optionally the pH of the solution may be adjusted to about 7 to about 8 before it is applied to the surface of the hydrophilic ionomeric polymer coating layer; heating the membrane at a temperature in a range of about 40° C. to about 80° C. for about 10 min to about 2 h for a bulk polymerization between the polyamine and the cross-linking agent or between the mixture of the polyamine and the diamine molecule and the cross-linking agent to form a cross-linked protonated polyamine anion exchange polymer layer on top of the hydrophilic ionomeric polymer coating layer; and finally applying another layer of a solution comprising a hydrophilic ionomeric polymer to the surface of the cross-linked protonated polyamine anion exchange polymer.

In some embodiments, the first solution comprises a polyamine or a mixture of a polyamine and a diamine, as well as a solvent, wherein the concentration of the polyamine or the mixture of the polyamine and the diamine in a range of about 0.2 wt % to about 10 wt %. The solvent may be selected from water, acetone, C1-C4 alcohols (i.e., one or more of methanol, ethanol, propanol, and butanol), or combinations thereof.

In some embodiments, the second solution comprises a cross-linking agent and an organic solvent, wherein the concentration of the cross-linking agent in a range of about 0.05 wt % to about 5 wt %. The organic solvent may be selected from C5-C10 alkanes (one or more of pentane, hexane, heptane, octane, nonane, and decane), acetone, tetrahydrofuran, 1,3-dioxolane, C1-C4 alcohols (i.e., one or more of methanol, ethanol, propanol, and butanol), or combinations thereof.

In some embodiments, the third solution comprises a polyamine, a cross-linking agent, and a solvent, or a polyamine, a diamine, a cross-linking agent, and a solvent, wherein the total concentration of the polyamine and the cross-linking agent, or the polyamine, the diamine, and the cross-linking agent in a range of about 0.2 wt % to about 10 wt %. The solvent may be selected from water, acetone, C1-C4 alcohols (i.e., one or more of methanol, ethanol, propanol, and butanol), or combinations thereof.

In some embodiments, the final coated membrane is dried for a time in a range of 5 min to 5 h, or 5 min to 4 h, or 5 min to 3 h, or 10 min to 2 h, or 30 min to 1 h at a temperature in a range of 40° C. to 100° C., or 40° C. to 80° C., or 55° C. to 65° C.

In some embodiments, the hydrophilic ionomeric polymer-coated microporous substrate membrane is treated in HCl aqueous solution with a concentration in a range of 0.1 M to 3M before the coating of the cross-linked protonated polyamine anion exchange polymer layer on top of the hydrophilic ionomeric polymer layer. The hydrophilic ionomeric polymer-coated microporous substrate membrane has high hydrophilicity due to the existence of —OH or —COOH polar functional groups, which will facilitate $H_3O^+$ transport to achieve high $H_3O^+$ permeability and conductivity. The hydrophilic ionomeric polymer-coated microporous substrate membrane also serves as a gutter layer for the formation of a thin defect-free layer of cross-linked protonated polyamine anion exchange polymer layer via interfacial polymerization or bulk polymerization. The cross-linked protonated polyamine anion exchange polymer coating layer comprises anion exchange functional groups such as —$R_3N^+$, —$R_2(H)N^+$, —$H_3(R)N^+$) for $Cl^-$ conducting, which will enable the use of high electrolyte concentration solutions that can increase the volumetric energy density and reduce electrolyte tank size for redox flow battery applications. The hydrophilic ionomeric polymer protective layer on top of the cross-linked protonated polyamine anion exchange polymer coating layer protects the cross-linked protonated polyamine anion exchange polymer coating layer and also facilitates $H_3O^+$ and $Cl^-$ transport due to its high hydrophilicity with —OH or —COOH polar functional groups to achieve high ionic permeability and conductivity. The new sandwich-structured TFC anion exchange membrane showed much lower EIS resistance and much higher VE and EE than the hydrophilic ionomeric polymer-coated membrane without the cross-linked protonated polyamine anion exchange polymer coating layer for all-iron flow battery application.

In some embodiments, the sandwich-structured TFC anion exchange membrane was treated in a redox flow battery cell comprising a positive electrolyte solution and a negative electrolyte solution, wherein the positive electrolyte and negative electrolyte solutions are circulating at room temperature, and wherein the positive electrolyte solution comprises water, a first amino acid such as glycine, an inorganic acid such as HCl an iron precursor such as $FeCl_2$, a supporting electrolyte such as $NH_4Cl$, and optionally a boric acid, and wherein the negative electrolyte comprises water, the iron precursor, the supporting electrolyte, and a negative electrolyte additive such as boric acid or a mixture of boric acid and glycine and with a pH greater than or equal to the pH of the positive electrolyte solution.

In some embodiments, the dried sandwich-structured coating layer side is exposed to the positive electrolyte solution and the microporous substrate membrane side is exposed to the negative electrolyte solution simultaneously for 10 min to 10 h, or 30 min to 6 h, or 1 h to 4 h at 10° C. to 60° C., or 20° C. to 50° C., or 20° C. to 30° C.

In some embodiments, the solution comprising the first or second hydrophilic ionomeric polymer may also comprise an inorganic or organic acid. The inorganic acid can be selected from, but is not limited to, HCl, $H_2SO_4$, or $H_3PO_4$. The organic acid can be selected from, but is not limited to, acetic acid or lactic acid.

In some embodiments, the hydrophilic ionomeric polymer is a negatively charged polysaccharide polymer, a positively charged polysaccharide polymer, or combinations thereof. The charged polysaccharides refer to polysaccharides that carry charged groups in the molecules, which include both negatively and positively charged polysaccharides. The positively charged polysaccharides may carry positively charged groups such as —$NH_3^+$, —$NRH_2^+$, —$NR_3^+$, or —$NR_3^+$. The negatively charged polysaccharides may carry negatively charged groups such as —$COO^-$, —$SO_3^-$, $PO_3^{2-}$, —$PO_3H^-$, or —$C_6H_4O^-$. The charged groups help with the solubility of polysaccharides, which is achieved by increasing the molecular affinity to water and preventing the intermolecular association due to the electrostatic effects posed by the charged group.

In some embodiments, the negatively charged polysaccharide polymer comprises sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, κ-carrageenan, λ-carrageenan, ι-carrageenan, pectic acid, chitin, chondroitin, xanthan gum, sodium carboxymethyl curdlan, potassium carboxymethyl curdlan, calcium carboxymethyl curdlan, carboxymethyl curdlan, ammonium carboxymethyl curdlan, sodium carboxymethyl cellulose, carboxymethyl cellulose, potassium carboxymethyl cellulose, calcium carboxymethyl cellulose, ammonium carboxymethyl cellulose, or combinations thereof.

In some embodiments, the positively charged polysaccharide polymer is protonated chitosan.

In some embodiments, the hydrophilic ionomeric polymer is a poly(acrylic acid) polymer, a poly(methacrylic acid) polymer, a poly(ethylacrylic acid) polymer, a polyethylene-co-acrylic acid polymer, a polybutadiene-co-acrylic acid polymer, a polypropylene-co-acrylic acid polymer, and combinations thereof.

In some embodiments, the positive electrolyte solution with a pH of 1.5 or lower comprises water, a first amino acid such as glycine, an inorganic acid such as HCl, an iron precursor such as FeCl$_2$ or a combination of FeCl$_2$ and FeCl$_3$, a supporting electrolyte such as NH$_4$Cl or KCl, and optionally a boric acid.

In some embodiments, the negative electrolyte solution with a pH greater than or equal to the pH of the positive electrolyte solution comprises water, an iron precursor such as FeCl$_2$ or a combination of FeCl$_2$ and FeCl$_3$, a supporting electrolyte such as NH$_4$Cl or KCl and a negative electrolyte additive such as boric acid or a mixture of boric acid and glycine.

Another aspect of the invention is a redox flow battery system. In one embodiment, the redox flow battery system comprises: at least one rechargeable cell comprising a positive electrolyte, a negative electrolyte, and an anionic conductive sandwich-structured TFC anion exchange membrane positioned between the positive electrolyte and the negative electrolyte, the positive electrolyte in contact with a positive electrode, and the negative electrolyte in contact with a negative electrode, wherein the sandwich-structured TFC anion exchange membrane comprises a microporous substrate membrane, a first hydrophilic ionomeric polymer coating layer on the surface of the microporous substrate layer, a cross-linked protonated polyamine anion exchange polymer coating layer on top of the hydrophilic ionomeric polymer coating layer, and a second hydrophilic ionomeric polymer protective layer on top of the cross-linked protonated polyamine anion exchange polymer coating layer to form the sandwich-structured TFC anion exchange membrane, wherein the cross-linked protonated polyamine anion exchange polymer coating layer is formed from a cross-linking reaction between a cross-linking agent and a polyamine or a mixture of a polyamine and a diamine molecule.

Suitable hydrophilic ionomeric polymers in the sandwich-structured TFC anion exchange membrane in the redox flow battery system include, but are not limited to, a poly(acrylic acid) polymer, a poly(methacrylic acid) polymer, various types of polysaccharide polymers such as alginic acid, hyaluronic acid, carrageenic acid, chitosan, pectinic acid, pectic acid, carboxymethyl curdlan, carboxymethyl cellulose acid, or combinations thereof.

Suitable polyamine polymers for the preparation of the sandwich-structured TFC anion exchange membrane in the redox flow battery system include, but are not limited to, polyethylenimine (PEI), spermine, polyvinylamine (PVAm), poly(allylamine) (PAA), poly(amidoamine) (PAMAM), poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, or combinations thereof.

Suitable cross-linking agents for the preparation of the sandwich-structured TFC anion exchange membrane in the redox flow battery system include, but are not limited to, trimesoyl chloride (TMC), ethylene glycol diglycidyl ether (EDGE), epichlorohydrin, a dibromoalkane, a dianhydride, a diisocyanate, a polyimide, a polysaccharide, or combinations thereof.

In some embodiment, the negative electrolyte, the positive electrolyte, or both the negative electrolyte and the positive electrolyte comprises a boric acid additive.

In some embodiment, the negative electrolyte, the positive electrolyte, or both the negative electrolyte and the positive electrolyte comprises ferrous chloride.

In some embodiment, the positive electrolyte comprises ferrous chloride and hydrochloric acid.

In some embodiment, the positive electrolyte comprises ferrous chloride, ferric chloride, and hydrochloric acid.

In some embodiment, the positive electrolyte and the negative electrolyte have the same composition.

In some embodiment, the positive electrolyte consists essentially of FeCl$_2$ at a concentration of 1.0-4.5 M, NH$_4$Cl at a concentration of 1.0-4.0 M, HCl at a concentration of 0.05-2.5 M, and glycine at a concentration of 0.01-3.0 M, optionally boric acid at a concentration of 0.01-1.0 M, and optionally FeCl$_3$ at a concentration of 0.1-1.0 M.

In some embodiment, the positive electrolyte consists essentially of FeCl$_2$ at a concentration of 1.0-4.5 M, KCl at a concentration of 1.0-3.0 M, HCl at a concentration of 0.05-2.5 M, and glycine at a concentration of 0.01-3.0 M, optionally boric acid at a concentration of 0.01-1.0 M, and optionally FeCl$_3$ at a concentration of 0.1-1.0 M.

In some embodiment, the negative electrolyte consists essentially of FeCl$_2$ at a concentration of 1.0-4.5 M, NH$_4$Cl at a concentration of 1.0-4.0 M, optionally boric acid at a concentration of 0.01-1.0 M, optionally glycine at a concentration of 0.01-3.0 M, and optionally FeCl$_3$ at a concentration of 0.1-1.0 M.

In some embodiment, the negative electrolyte consists essentially of FeCl$_2$ at a concentration of 1.0-4.5 M, KCl at a concentration of 1.0-3.0 M, optionally boric acid at a concentration of 0.01-1.0 M, optionally glycine at a concentration of 0.01-3.0 M, and optionally FeCl$_3$ at a concentration of 0.1-1.0 M.

EXAMPLES

Comparative Example 1: Preparation of Alginic Acid/Daramic® Composite Membrane (Abbreviated as D-6Alg-12)

A 6.0 wt % sodium alginate aqueous solution was prepared by dissolving sodium alginate polymer in de-ionized water. One surface of a Daramic® microporous support membrane purchased from Daramic, LLC was coated with a thin layer of the 6.0 wt % sodium alginate aqueous solution and dried at 60° C. for 2 h in an oven to form a sodium alginate layer with a thickness of about 5-6 micrometers on the surface of the Daramic® substrate membrane. The dried membrane was treated with a 1.0 M hydrochloric acid aqueous solution for 30 min to convert sodium alginate coating layer to alginic acid coating layer to form D-6Alg-12 membrane.

Example 1: Preparation of Sandwich-Structured TFC Anion Exchange Membrane Using Trimesoyl Chloride (TMC) Cross-Linked Polyethylenimine (PEI) and Piperazine as the Middle Layer and Alginic Acid as the Bottom and Top Layers (Abbreviated as D-6Alg-12-PEI-P-1Alg-H)

The sandwich-structured TFC anion exchange membrane D-6Alg-12-PEI-P-1Alg-H was prepared in three steps. In the first step, one surface of a Daramic® microporous support membrane purchased from Daramic, LLC was coated with a thin layer of a 6 wt % sodium alginate aqueous solution with a knife gap of 12 mil and dried at 60° C. for 1 h in an oven to form a sodium alginate coating layer on the surface of the Daramic® support membrane. The sodium alginate-coated Daramic membrane was treated by a 1.0 M HCl aqueous solution for 1 h to convert sodium alginate to alginic acid. In the second step, a polyethylenimine/piperazine solution was prepared by dissolving a mixture of polyethylenimine and piperazine (weight ratio of 9:1) in de-ionized water to form a 3 wt % polyethylenimine/piperazine solution. The polyethylenimine/piperazine solution was coated onto the surface of the alginic acid-coated Daramic membrane for 5 min. The excess polyethylenimine/piperazine solution was then dripped off from the membrane surface vertically and dried in air for 2 min. A 0.3 wt % trimesoyl chloride (TMC) solution in hexane was applied to the polyethylenimine/piperazine-treated membrane surface for 2 min to form a cross-linked polyethylenimine-based polymer coating layer followed by washing with hexane three times. The membrane was then dried in air overnight. In the third step, a sodium alginate protective layer was coated onto the surface of the cross-linked polyethylenimine-based polymer coating layer by using a 1 wt % sodium alginate aqueous solution. After soaking for 1 min, the excess sodium alginate solution was dripped off vertically. The membrane was dried at 60° C. for 2 h. The membrane was finally treated with a 1.0 M HCl aqueous solution for 1 h to convert the top sodium alginate protective layer into alginic acid protective layer and convert the cross-linked polyethylenimine-based polymer coating layer into a cross-linked protonated polyethylenimine-based anion exchange polymer coating layer.

Example 2: All-Iron Redox Flow Battery Performance Study on Nafion® 117 and D-6Alg-12-PEI-P-1Alg-H Membranes The ionic conductivity, number of battery charge/discharge cycles, VE, CE, and EE of the commercial Nafion® 117 membrane and D-6Alg-12-PEI-P-1Alg-H membrane as described in Example 1 were evaluated using an electrolyte formula comprising a positive electrolyte solution and a negative electrolyte solution. The positive electrolyte solution comprises 2.4 M $FeCl_2$, 0.6 M 2.0 M $FeCl_3$, 0.3 M ascorbic acid, and 0.9 M KOH in ultrapure water (18.2 MΩ·cm). The negative solution comprises 3.0 M $FeCl_2$ and 0.2 M boric acid in ultrapure water (18.2 MΩ·cm). The membrane performance was measured using EIS with a BCS-810 battery cycling system (Biologic, FRANCE) at room temperature, The results are shown in Table 1. It can be seen from Table 1 that the D-6Alg-12-PEI-P-1Alg-H membrane showed lower area specific resistance, much longer battery cycles, higher VE, CE, and EE than the Nafion® 117 membrane. This demonstrates that the D-6Alg-12-PEI-P-1Alg-H membrane significantly improved the membrane performance compared to commercially available Nafion® 117 membrane in the absence of KCl supporting electrolyte.

TABLE 1

All-Iron Redox Flow Battery Performance Measurements on Nafion ® 117 and D-6Alg-12-PEI-P-1Alg-H Membranes [a]

| Membrane | Area Specific Resistance (Ω · cm$^2$) | # Cycles | VE (%) | CE (%) | EE (%) |
|---|---|---|---|---|---|
| Nafion ® 117 | 7.52 | 3 | 46.0 | 56.1 | 25.8 |
| D-6Alg-12-PEI-P-1Alg-H | 2.31 | 28 | 62.4 | 80.4 | 50.2 |

[a] Charge current density: 30 mA/cm$^2$; charge time: 4 h; discharge current density: 30 mA/cm$^2$; discharge time: 4 h; # of cycles were counted with ≥ 70% CE.

Example 3: Preparation of Sandwich-Structured Anion Exchange Membrane Using Cross-Linked TMC Cross-Linked Partially Protonated-PEI as the Middle Layer and Alginic Acid as the Bottom and Top Layers (Abbreviated as D-8Alg-9-PEI-1Alg-H)

The sandwich-structured TFC anion exchange membrane D-8Alg-9-PEI-1Alg-H was prepared in three steps. In the first step, one surface of a Daramic® microporous support membrane was coated with a thin layer of a 8 wt % sodium alginate aqueous solution with a knife gap of 9 mil and dried at 45° C. in an oven to form a sodium alginate coating layer on the surface of the Daramic® support membrane. In the second step, a polyethylenimine solution was prepared by dissolving a polyethylenimine in de-ionized water to form a 5 wt % polyethylenimine solution. The pH of the polyethylenimine solution was adjusted to 7.6. The 5 wt % polyethylenimine solution was coated onto the surface of the sodium alginate-coated Daramic membrane for 1 min. The excess polyethylenimine solution was then dripped off from the membrane surface vertically and dried in air for 20 min. A 0.15 wt % trimesoyl chloride solution in hexane was applied to the polyethylenimine-treated membrane surface and shaken for 30 sec to form a cross-linked partially protonated polyethylenimine coating layer followed by washing with hexane three times. The membrane was dried in air for 10 min. In the third step, a sodium alginate protective layer was coated onto the surface of the cross-linked partially protonated polyethylenimine-based polymer coating layer by using a 1 wt % sodium alginate aqueous solution. After soaking for 1 min, the excess sodium alginate solution was dripped off vertically. The membrane was dried in air for 1 h. The membrane was finally treated with a 1.0 M HCl aqueous solution for 1 h to convert the top sodium alginate protective layer and the bottom sodium alginate coating layer into alginic acid protective layer and alginic acid coating layer, respectively, and convert the cross-linked partially protonated polyethylenimine-based polymer coating layer into a cross-linked protonated polyethylenimine-based anion exchange polymer coating layer.

Example 4: Preparation of Sandwich-Structured Anion Exchange Membrane Using TMC Cross-Linked Partially Protonated-PEI as the Middle Layer and Alginic Acid as the Bottom and Top Layers (Abbreviated as D-8Alg-9-PEI-1Alg)

The sandwich-structured anion exchange membrane D-8Alg-9-PEI-1Alg was prepared in four steps. In the first step, one surface of a Daramic® microporous support membrane was coated with a thin layer of a 8 wt % sodium alginate aqueous solution with a knife gap of 9 mil and dried at 45° C. in an oven to form a sodium alginate coating layer on the surface of the Daramic® support membrane. In the second step, a polyethylenimine solution was prepared by dissolving a polyethylenimine in de-ionized water to form a 5 wt % polyethylenimine solution. The pH of the polyethylenimine solution was adjusted to 7.6. The 5 wt % polyethylenimine solution was coated onto the surface of the sodium alginate-coated Daramic membrane for 1 min. The excess polyethylenimine solution was then dripped off from the membrane surface vertically and dried in air for 20 min. A 0.15 wt % trimesoyl chloride solution in hexane was applied to the polyethylenimine-treated membrane surface and shaken for 30 sec to form a cross-linked partially protonated polyethylenimine coating layer followed by washing with hexane three times. The membrane was dried in air for 10 min. In the third step, a sodium alginate protective layer was coated onto the surface of the cross-linked partially protonated polyethylenimine-based polymer coating layer by using a 1 wt % sodium alginate aqueous solution. After soaking for 1 min, the excess sodium alginate solution was dripped off vertically. The membrane was dried in air for 1 h. In the fourth step, the dried membrane was treated with the electrolyte solutions by simultaneously contacting the coated membrane side with a positive electrolyte solution and contacting the microporous Daramic® support membrane side with a negative electrolyte solution. The positive electrolyte solution having $FeCl_2$, $NH_4Cl$, glycine, boric acid, and HCl with a pH of ~0.6 and a negative electrolyte solution having $FeCl_2$, $NH_4Cl$, boric acid, and $NH_4OH$ with a pH of ~1.6. Both the positive and negative electrolyte solutions were circulated using two pumps for 2 h. The positive and negative electrolyte solution treatment on the membrane resulted in the formation of sandwich-structured anion exchange D-8Alg-9-PEI-1Alg.

Example 5: All-Iron Redox Flow Battery Performance Study on D-6Alg-12 and D-8Alg-9-PEI-1Alg Membranes The ionic conductivity, number of battery charge/discharge cycles, VE, CE, and EE of D-6Alg-12 membrane as described in Comparative Example 1 and D-8Alg-9-PEI-1Alg membrane as described in Example 4 were evaluated using an electrolyte formula comprising a positive electrolyte solution and a negative electrolyte solution. The positive electrolyte solution comprises 2.5 M $FeCl_2$, 3.25 M $NH_4Cl$, 0.6 M glycine, and 0.1 M boric acid in ultrapure water (18.2 M$\Omega$·cm) with a pH of 0.6. The negative solution comprises 2.5 M $FeCl_2$, 3.25 M $NH_4Cl$, and 0.1 M boric acid in ultrapure water (18.2 M$\Omega$·cm) with a pH of 1.7. The membrane performance was measured using EIS with a BCS-810 battery cycling system (Biologic, FRANCE) at room temperature, The results are shown in Table 2. It can be seen from Table 2 that D-8Alg-9-PEI-1Alg membrane showed lower area specific resistance, longer battery cycles, higher VE and EE than D-6Alg-12 membrane without the cross-linked protonated polyethylenimine anion exchange polymer layer. This demonstrates that the D-8Alg-9-PEI-1Alg membrane significantly improved the membrane performance compared to D-6Alg-12 membrane in the absence of the cross-linked protonated polyethylenimine anion exchange polymer layer.

TABLE 2

All-Iron Redox Flow Battery Performance Measurements on D-6Alg-12 and D-8Alg-9-PEI-1Alg Membranes [a]

| Membrane | Area Specific Resistance ($\Omega \cdot cm^2$) | # Cycles | VE (%) | CE (%) | EE (%) |
|---|---|---|---|---|---|
| D-6Alg-12 | 2.54 | 38 | 61.8 | 95.8 | 59.2 |
| D-8Alg-9-PEI-1Alg | 1.45 | 58 | 69.5 | 93.9 | 65.3 |

[a] Charge current density: 30 mA/cm$^2$; charge time: 4 h; discharge current density: 30 mA/cm$^2$; discharge time: 4 h; # of cycles were counted with ≥ 70% CE.

SPECIFIC EMBODIMENTS

While the following is described in conjunction with specific embodiments, it will be understood that this description is intended to illustrate and not limit the scope of the preceding description and the appended claims.

A first embodiment of the invention is a thin film composite anion exchange membrane comprising a microporous substrate membrane; a first hydrophilic ionomeric polymer coating layer on a surface of the microporous substrate membrane; a cross-linked protonated polymeric polyamine anion exchange layer on a second surface of the first hydrophilic ionomeric polymer coating layer; a second hydrophilic ionomeric polymer coating layer on a second surface of the cross-linked protonated polymeric polyamine anion exchange layer. An embodiment of the invention is one, any or all of prior embodiments in this paragraph up through the first embodiment in this paragraph wherein the cross-linked protonated polymeric polyamine anion exchange layer comprises the reaction product of a cross-linking agent and a polyamine polymer. An embodiment of the invention is one, any or all of prior embodiments in this paragraph up through the first embodiment in this paragraph wherein the cross-linking agent comprises trimesoyl chloride, ethylene glycol diglycidyl ether, epichlorohydrin, a dibromoalkane, a dianhydride, a diisocyanate, a polyimide, a polysaccharide, or combinations thereof. An embodiment of the invention is one, any or all of prior embodiments in this paragraph up through the first embodiment in this paragraph wherein the polysaccharide comprises at least one of dextran, pullulan, carboxymethyl cellulose, sodium alginate, chitosan, hyaluronate, carboxymethyl curdlan, pectic acid, chitin, chondroitin, xanthan gum, pectic acid, and combinations thereof. An embodiment of the invention is one, any or all of prior embodiments in this paragraph up through the first embodiment in this paragraph wherein the polyamine polymer comprises polyethyleneimine, spermine, poly(vinylamine), poly(allylamine), poly(amidoamine), poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, or combinations thereof. An embodiment of the invention is one, any or all of prior embodiments in this paragraph up through the first embodiment in this paragraph wherein the reaction product comprises the reaction product of the cross-linking agent, the polyamine, and a diamine. An embodiment of the invention is one, any or all of prior embodiments in this paragraph up through the first embodiment in this paragraph wherein the diamine comprises at least one of piperazine, 1,4-diazacycloheptane, ethylenediamine, 1,2-dimethylethylenediamine, 1,3-diaminopropane, putrescine, cadaverine, hexamethylenediamine, diphenylethylenediamine, 1,4-diazacycloheptane, p-phenylenediamine, m-phenylenediamine, o-phenylenediamine, p-xylylenediamine, m-xylylenediamine, o-xylylenediamine, and combinations thereof. An embodiment of the invention is one, any or all of prior embodiments in this paragraph up through the first embodiment in this paragraph wherein the hydrophilic ionomeric polymer comprises at least one of a polysaccharide polymer, a poly(acrylic acid) polymer, a poly(methacrylic acid) polymer, a poly(ethylacrylic acid) polymer, a polyethylene-co-acrylic acid polymer, a polybutadiene-co-acrylic acid polymer, a polypropylene-co-acrylic acid polymer, and combinations thereof. An embodiment of the invention is one, any or all of prior embodiments in this paragraph up through the first embodiment in this paragraph wherein the first hydrophilic ionomeric polymer coating layer is made of a first hydrophilic ionomeric polymer and wherein the second hydrophilic ionomeric polymer coating layer is made of a second hydrophilic ionomeric polymer and wherein the first hydrophilic ionomeric polymer is different from the second hydrophilic ionomeric polymer. An embodiment of the invention is one, any or all of prior embodiments in this paragraph up through the first embodiment in this paragraph wherein the first hydrophilic ionomeric polymer coating layer comprises an asymmetric hydrophilic ionomeric polymer coating layer comprising: a porous layer having a first surface and a second surface, the first surface of the porous layer on the surface of the microporous substrate layer; and a nonporous layer on the second surface of the porous layer. An embodiment of the invention is one, any or all of prior embodiments in this paragraph up through the first embodiment in this paragraph wherein at least one of a thickness of the first hydrophilic ionomeric polymer coating layer is in a range of about 1 micrometer to about 100 micrometers; a thickness of the cross-linked protonated polyamine anion exchange polymer coating layer is in a range of about 10 nanometers to about 10 micrometers; and a thickness of the second hydrophilic ionomeric polymer protective layer on top of the cross-linked protonated polyamine anion exchange polymer coating layer is in a range of about 100 nanometers to about 20 micrometers.

A second embodiment of the invention is a method of preparing a thin film composite anion exchange membrane comprising: applying a layer of a solution comprising a first hydrophilic ionomeric polymer to one surface of a microporous substrate membrane; drying the coated membrane forming a first hydrophilic ionomeric polymer coating layer on the microporous substrate membrane; applying a first solution comprising a polyamine or a mixture of a polyamine and a diamine and a second solution comprising a cross-linking agent to a surface of the first hydrophilic ionomeric polymer coating layer to form a cross-linked protonated polyamine anion exchange polymer layer, or applying a third solution of a mixture of a polyamine and a cross-linking agent, or a mixture of a polyamine, a diamine, and a cross-linking agent to the surface of the first hydrophilic ionomeric polymer coating layer to form a cross-linked protonated polyamine anion exchange polymer layer; and applying a second layer of a solution comprising a second hydrophilic ionomeric polymer to a second surface of the cross-linked protonated polyamine anion exchange polymer. An embodiment of the invention is one, any or all of prior embodiments in this paragraph up through the second embodiment in this paragraph further comprising adjusting the first solution to a pH of about 7 to about 8 before the first solution is applied to the surface of the first hydrophilic ionomeric polymer coating layer. An embodiment of the invention is one, any or all of prior embodiments in this paragraph up through the second embodiment in this paragraph further comprising heating the microporous substrate membrane with the first hydrophilic ionomeric polymer coating layer and the first and second solutions thereon or the microporous substrate membrane with the first hydrophilic ionomeric polymer coating layer and the third solution coated membrane at a temperature in a range of about 40° C. to about 80° C. before applying the second layer of the solution comprising the second hydrophilic ionomeric polymer. An embodiment of the invention is one, any or all of prior embodiments in this paragraph up through the second embodiment in this paragraph further comprising treating the first hydrophilic ionomeric polymer coating layer with an aqueous HCl solution before applying the first and second solutions or the third solution. An embodiment of the invention is one, any or all of prior embodiments in this paragraph up through the second embodiment in this paragraph wherein the first solution comprises an aqueous solution with a concentration of the polyamine or the mixture of the polyamine and the diamine in a range of about 0.2 wt % to about 10 wt %. An embodiment of the invention is one, any or all of prior embodiments in this paragraph up through the second embodiment in this paragraph wherein the second solution comprises an organic solution with a concentration of the cross-linking agent in a range of about 0.05 wt % to about 5 wt %. An embodiment of the invention is one, any or all of prior embodiments in this paragraph up through the second embodiment in this paragraph wherein the organic solution is prepared using an organic solvent selected from C5-C10 alkanes, acetone, tetrahydrofuran, 1,3-dioxolane, C1-C4 alcohols, or combinations thereof. An embodiment of the invention is one, any or all of prior embodiments in this paragraph up through the second embodiment in this paragraph wherein the third solution comprises an aqueous solution with a concentration of the polyamine, the diamine, and the cross-linking agent in a range of about 0.2 wt % to about 10 wt %.

A third embodiment of the invention is a redox flow battery system, comprising at least one rechargeable cell comprising a positive electrolyte, a negative electrolyte, and thin film composite anion exchange membrane positioned between the positive electrolyte and the negative electrolyte, the positive electrolyte in contact with a positive electrode, and the negative electrolyte in contact with a negative electrode, wherein the thin film composite anion exchange membrane comprises a microporous substrate membrane; a first hydrophilic ionomeric polymer coating layer on a surface of the microporous substrate membrane; a cross-linked protonated polymeric polyamine anion exchange layer on a second surface of the first hydrophilic ionomeric polymer coating layer; a second hydrophilic ionomeric polymer coating layer on a second surface of the cross-linked protonated polymeric polyamine anion exchange layer; the positive electrolyte consisting essentially of $FeCl_2$ at a concentration of 1.0-4.5 M, $NH_4Cl$ at a concentration of 1.0-4.0 M or KCl at a concentration of 1.0-3.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, $NH_4Cl$ at a concentration of 1.0-4.0 M or KCl at a concentration of 1.0-3.0 M, optionally boric acid at a concentration of 0.01-1.0 M, optionally glycine at a concentration of 0.01-3.0 M, and optionally $FeCl_3$ at a concentration of 0.1-1.0 M.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A thin film composite anion exchange membrane comprising:
   a microporous substrate membrane;
   a first nonporous water-insoluble hydrophilic ionomeric polymer coating layer on a surface of the microporous substrate membrane;
   a cross-linked protonated polymeric polyamine anion exchange layer on a second surface of the first hydrophilic ionomeric polymer coating layer; and
   a second nonporous water-insoluble hydrophilic ionomeric polymer coating layer on a second surface of the cross-linked protonated polymeric polyamine anion exchange layer,
   wherein the first and second hydrophilic ionomeric polymer coating layers comprise alginic acid, hyaluronic acid, carrageenic acid, or combinations thereof.

2. The anion exchange membrane of claim 1 wherein the nonporous cross-linked protonated polymeric polyamine anion exchange layer comprises the reaction product of a cross-linking agent and a polyamine polymer.

3. The anion exchange membrane of claim 2 wherein the cross-linking agent comprises trimesoyl chloride, ethylene glycol diglycidyl ether, epichlorohydrin, a dibromoalkane, a dianhydride, a diisocyanate, a polyimide, a polysaccharide, or combinations thereof.

4. The anion exchange membrane of claim 3 wherein the polysaccharide comprises at least one of chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, K-carrageenan, A-carrageenan, t-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

5. The anion exchange membrane of claim 2 wherein the polyamine polymer comprises polyethyleneimine, spermine, poly(vinylamine), poly(allylamine), poly(amidoamine), poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, or combinations thereof.

6. The anion exchange membrane of claim 2 wherein the reaction product comprises the reaction product of the cross-linking agent, the polyamine, and a diamine.

7. The anion exchange membrane of claim 6 wherein the diamine comprises at least one of piperazine, 1,4-diazacycloheptane, ethylenediamine, 1,2-dimethylethylenediamine, 1,3-diaminopropane, putrescine, cadaverine, hexamethylenediamine, diphenylethylenediamine, 1,4-diazacycloheptane, p-phenylenediamine, m-phenylenediamine, o-phenylenediamine, p-xylylenediamine, m-xylylenediamine, o-xylylenediamine, and combinations thereof.

8. The anion exchange membrane of claim 1 wherein the first nonporous water-insoluble hydrophilic ionomeric polymer coating layer is made of a first hydrophilic ionomeric polymer and wherein the second nonporous water-insoluble hydrophilic ionomeric polymer coating layer is made of a second hydrophilic ionomeric polymer and wherein the first hydrophilic ionomeric polymer is different from the second hydrophilic ionomeric polymer.

9. The anion exchange membrane of claim 1 wherein the first nonporous water-insoluble hydrophilic ionomeric polymer coating layer comprises an asymmetric hydrophilic ionomeric polymer coating layer comprising;
   a porous layer having a first surface and a second surface, the first surface of the porous layer on the surface of the microporous substrate layer; and
   a nonporous layer on the second surface of the porous layer.

10. The anion exchange membrane of claim 1 wherein at least one of:
    a thickness of the first nonporous water-insoluble hydrophilic ionomeric polymer coating layer is in a range of about 1 micrometer to about 100 micrometers;
    a thickness of the cross-linked protonated polyamine anion exchange polymer coating layer is in a range of about 10 nanometers to about 10 micrometers; and
    a thickness of the second nonporous water-insoluble hydrophilic ionomeric polymer protective layer on top of the cross-linked protonated polyamine anion exchange polymer coating layer is in a range of about 100 nanometers to about 20 micrometers.

11. A redox flow battery system, comprising:
    at least one rechargeable cell, each rechargeable cell comprising a positive electrolyte, a negative electrolyte, and thin film composite anion exchange membrane positioned between the positive electrolyte and the negative electrolyte, the positive electrolyte in contact with a positive electrode, and the negative electrolyte in contact with a negative electrode, wherein the thin film composite anion exchange membrane comprises a microporous substrate membrane; a first nonporous water-insoluble hydrophilic ionomeric polymer coating layer on a surface of the microporous substrate membrane; a cross-linked protonated polymeric polyamine anion exchange layer on a second surface of the first nonporous water-insoluble hydrophilic ionomeric polymer coating layer; a second nonporous water-insoluble hydrophilic ionomeric polymer coating layer on a second surface of the cross-linked protonated polymeric polyamine anion exchange layer;
    the positive electrolyte consisting essentially of $FeCl_2$ at a concentration of 1.0-4.5 M, $NH_4Cl$ at a concentration of 1.0-4.0 M or KCl at a concentration of 1.0-3.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and
    the negative electrolyte consisting essentially of $FeCl_2$ at a concentration of 1.0-4.5 M, $NH_4Cl$ at a concentration of 1.0-4.0 M or KCl at a concentration of 1.0-3.0 M, optionally boric acid at a concentration of 0.01-1.0 M, optionally glycine at a concentration of 0.01-3.0 M, and optionally $FeCl_3$ at a concentration of 0.1-1.0 M,
    wherein the first and second hydrophilic ionomeric polymer coating layers comprise a alginic acid, hyaluronic acid, carrageenic acid, or a mixture thereof.

* * * * *